(12) United States Patent
Kuramori et al.

(10) Patent No.: US 6,983,780 B2
(45) Date of Patent: Jan. 10, 2006

(54) RUN-FLAT TIRE AND TIRE/WHEEL ASSEMBLY

(75) Inventors: Akira Kuramori, Hiratsuka (JP); Atsushi Tanno, Hiratsuka (JP); Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 72 days.

(21) Appl. No.: 10/617,768

(22) Filed: Jul. 14, 2003

(65) Prior Publication Data

US 2004/0016494 A1 Jan. 29, 2004

(30) Foreign Application Priority Data

Jul. 25, 2002 (JP) .............................. 2002-216588

(51) Int. Cl.
*B60C 17/02* (2006.01)
*B60C 5/16* (2006.01)
(52) U.S. Cl. ...................................... 152/520; 152/400
(58) Field of Classification Search ................ 152/516, 152/520, 400–401, 381.4, 381.5, 158, 399; 301/39.1, 40.3, 40.4
See application file for complete search history.

(56) References Cited

U.S. PATENT DOCUMENTS

| 4,281,701 | A | * | 8/1981 | Ross | ........................... 152/158 |
| 4,674,549 | A | * | 6/1987 | Bush | ........................... 152/158 |
| 6,311,752 | B1 | * | 11/2001 | Hojo | ........................... 152/541 |
| 6,463,974 | B1 | * | 10/2002 | Hellweg et al. | ............. 152/400 |
| 6,463,976 | B1 | * | 10/2002 | Glinz et al. | .................. 152/520 |
| 6,705,368 | B2 | * | 3/2004 | Glinz et al. | .................. 152/400 |
| 2004/0011447 | A1 | * | 1/2004 | Kuramori et al. | |
| 2004/0016490 | A1 | * | 1/2004 | Shimura et al. | |
| 2004/0025994 | A1 | * | 2/2004 | Seko et al. | |
| 2004/0025995 | A1 | * | 2/2004 | Kuramori et al. | |
| 2004/0035513 | A1 | * | 2/2004 | Iida et al. | |

FOREIGN PATENT DOCUMENTS

| JP | 10-297226 A1 | 11/1998 |
| JP | 2001-163020 A1 | 6/2001 |
| JP | 2001-519279 A1 | 10/2001 |

* cited by examiner

*Primary Examiner*—Russell D. Stormer
*Assistant Examiner*—Jason R. Bellinger
(74) *Attorney, Agent, or Firm*—Rader, Fishman & Grauer PLLC

(57) ABSTRACT

The present inventions are a run-flat tire and a tire/wheel assembly in which the workability of the tire-to-rim fit has been improved while including a core-type run-flat support member. The tire/wheel assembly is formed by fitting a pneumatic tire into a wheel rim. In the tire/wheel assembly, the run-flat support member constituted of a circular shell and elastic rings is inserted into a cavity of the pneumatic tire, in which the circular shell has a support surface thereof extended toward the periphery of the tire and leg portions along each end of the support surface, and the elastic rings are attached to the leg portions of the circular shell. Meanwhile, stages extending in a tire circumferential direction are formed on the inner walls of a pair of right and left beads in the pneumatic tire, and the elastic rings are locked into the stages.

12 Claims, 2 Drawing Sheets

RUN-FLAT TIRE AND TIRE/WHEEL ASSEMBLY

BACKGROUND OF THE INVENTION

The present invention relates to a pneumatic tire and a tire/wheel assembly which enable run-flat traveling, and more specifically, to a run-flat tire and a tire/wheel assembly in which the workability of tire-to-rim fit has been improved.

To meet the demand from the market, numerous techniques have been proposed to enable a certain degree of emergency driving even when a pneumatic tire is punctured while driving a vehicle. Among those numerous proposals, the techniques proposed in Japanese Patent Laid-Open Publication No. 10-297226 and Published Japanese Translation of a PCT Application No. 2001-519279 enable run-flat traveling by fitting a core to a rim in a cavity of an assembled pneumatic tire and by supporting a flat tire with the core.

The foregoing run-flat core has an open-leg-structured circular shell including a support surface thereof extended toward the periphery of the tire and leg portions along each end of the support surface. The run-flat core is constituted by having elastic rings attached to both of these leg portions so that the core is supported on a rim through the elastic rings. The advantage of the run-flat core is that the available rims and wheels in the market can be used as their own, without any particular modification. Thus, the core can be accepted to the market without causing difficulties therein.

When fitting the core in the tire/wheel assembly, first, the core is inserted into the cavity of the pneumatic tire, and the pneumatic tire needs to be fit into the wheel rim while containing the core. However, there has been a problem that it is difficult to perform tire-to-rim fit since the core is able to freely move in a tire radial direction in the cavity of the pneumatic tire. Moreover, there has been another problem that it is hard to stably seat the elastic rings on rim humps.

SUMMARY OF THE INVENTION

An object of the present invention is to provide a run-flat tire and a tire/wheel assembly, in which the workability of tire-to-rim fit has been improved while including a core-type run-flat support member.

The run-flat tire of the present invention achieving the foregoing object is characterized as follows: The run-flat support member constituted of a circular shell is inserted into a cavity of a pneumatic tire, in which the circular shell has a support surface thereof extended toward the periphery of the tire and leg portions along each end of the support surface. Meanwhile, stages extending in a tire circumferential direction are formed on the inner walls of a pair of right and left beads, and the leg portions of the circular shell are locked into the stages.

Moreover, the run-flat tire of the present invention achieving the object is characterized as follows: The run-flat support member constituted of a circular shell and elastic rings is inserted into a cavity of a pneumatic tire, in which the circular shell has a support surface thereof extended toward the periphery of the tire and leg portions along each end of the support surface, and the elastic rings are attached to the leg portions of the circular shell. Meanwhile, stages extending in a tire circumferential direction are formed on the inner walls of a pair of right and left beads, and the elastic rings are lock into the stages.

At the same time, the tire/wheel assembly of the present invention is characterized as follows: The tire/wheel assembly is formed by fitting a pneumatic tire into a wheel rim. In the tire/wheel assembly, the run-flat support member constituted of a circular shell is inserted into a cavity of the pneumatic tire, in which the circular shell has a support surface thereof extended toward the periphery of the tire and leg portions along each end of the support surface. Meanwhile, stages extending in a tire circumferential direction are formed on the inner walls of a pair of right and left beads of the pneumatic tire, and the leg portions of the circular shell are locked into the stages.

Furthermore, the tire/wheel assembly of the present invention is characterized as follows: The tire/wheel assembly is formed by fitting a pneumatic tire into a wheel rim. In the tire/wheel assembly, the run-flat support member constituted of a circular shell and elastic rings is inserted into a cavity of the pneumatic tire, in which the circular shell has a support surface thereof extended toward the periphery of the tire and leg portions along each end of the support surface, and the elastic rings are attached to the leg portions of the circular shell. Meanwhile, stages extending in a tire circumferential direction are formed on the inner walls of a pair of right and left beads of the pneumatic tire, and the elastic rings are locked into the stages.

In the present invention, an outer diameter of the run-flat support member is formed to be smaller than an inner diameter of a tread of the pneumatic tire so that a constant distance is maintained between the run-flat support member and the pneumatic tire. The run-flat support member as well as the pneumatic tire is fit to the wheel rim while the run-flat support member is inserted into the cavity of the pneumatic tire, thereby constituting the tire/wheel assembly. The tire/wheel assembly is attached to a vehicle. When the pneumatic tire is punctured while driving, the punctured deflated tire is supported by the support surface of the circular shell of the run-flat support member. Therefore, the run-flat traveling is enabled.

According to the present invention, the stages extending in the tire circumferential direction are formed on the inner walls of the pair of the right and left beads. Either the leg portions of the circular shell which constitutes the run-flat support member or the elastic rings attached to the leg portions are locked into the stages. Thus, since the run-flat support member inserted into the cavity of the pneumatic tire does not move around in the tire radial direction, the workability of the tire-to-rim fit is excellent. In addition, since the run-flat support member is steadily coupled to the pneumatic tire, vehicle weight is stably sustained during run-flat traveling. As a result, the durability of the tire is improved during the run-flat traveling.

In the present invention, it is preferable that rubber portions farther inside than the stages of the beads in the tire radial direction be firmer than the adjacent rubber portions. This enhances weight support capability of the tire, and thereby improves the durability of the tire during the run-flat traveling.

DETAILED DESCRIPTION OF THE PREFERRED EMBODIMENTS

The present invention is detailed below with reference to the attached drawings.

Figure 1:
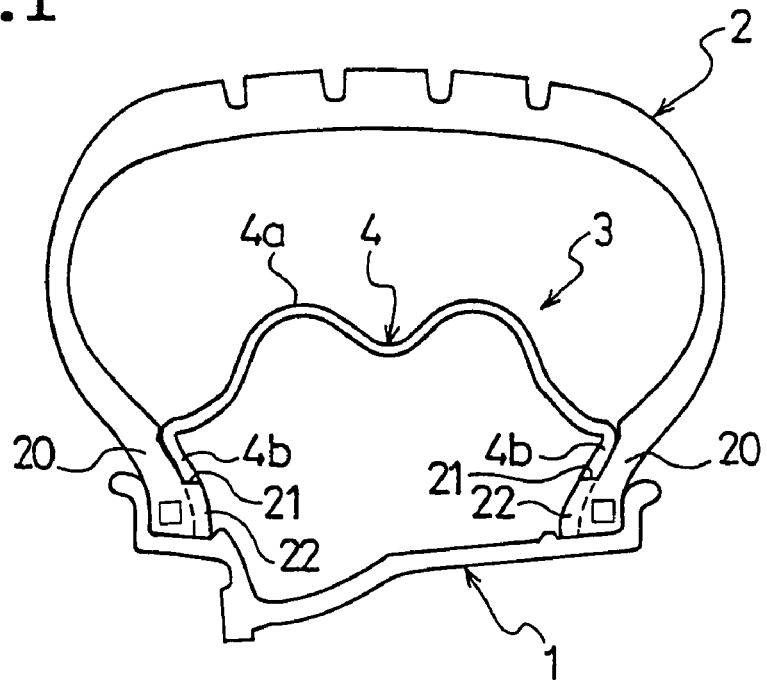
FIG. 1 is a meridian sectional view showing an essential part of a tire/wheel assembly formed in an embodiment of the present invention.

FIG. 1 is a meridian sectional view showing an essential part of a tire/wheel assembly (a wheel) formed in an embodiment of the present invention. Reference numerals 1, 2 and 3 denote a wheel rim, a pneumatic tire and a run-flat support member, respectively. These rim 1, pneumatic tire 2 and run-flat support member 3 are formed in a circle around a wheel rotational axis (not shown).

The run-flat support member 3 is inserted into a cavity of the pneumatic tire 2 and separated from a tread of the pneumatic tire 2 and the inner wall of a sidewall under normal driving conditions. When the pneumatic tire 2 is punctured, the run-flat support member 3 supports the deflated pneumatic tire 2 from the inside. In the present embodiment, a circular shell 4 constitutes a main part of the run-flat support member 3.

The circular shell 4 has an open leg structure in which a continuous support surface 4a for sustaining the flat tire is extended toward the periphery of the tire (outer radial direction), and leg portions 4b and 4b are provided along each end of the support surface 4a. The support surface 4a of the circular shell 4 is shaped so that the support surface 4a has a convexly curved portion toward the periphery of the tire at a cross section orthogonal to the circumferential direction. A minimum of one convexly curved portion is required, but two or more convexly curved portions are preferred to be aligned in a tire axial direction. Thus, the support surface 4a of the circular shell 4 is formed by aligning two or more convexly curved portions. Accordingly, two or more portions in contact with the inner wall of the tire can be distributed on the support surface 4a, and local wear on the inner wall of the tire can be reduced. Therefore, it is possible to extend a distance in which a vehicle endures run-flat traveling.

The foregoing circular shell 4 is made of a rigid material in order to sustain the vehicle weight through the punctured pneumatic tire 2. Metal, resin and the like are used for the constituent material. Steel and aluminum exemplify the metal. As for the resin, both thermoplastic resin and thermosetting resin can be used. Examples of thermoplastic resin are nylon, polyester, polyethylene, polypropylene, polystyrene, polyphenylene sulfide and ABS. Examples of thermosetting resin are epoxy resin and unsaturated polyester resin. Resin can be used as single resin or fiber reinforced resin by containing reinforcing fiber.

Meanwhile, stages 21 extending in the tire circumferential direction are formed on the inner walls of a pair of right and left beads 20 in the pneumatic tire 2. These stages 21 can be merely formed by unevenness of the inner walls or concave portions, and the leg portions 4b of the circular shell 4 are locked into the stages 21.

Figure 2:
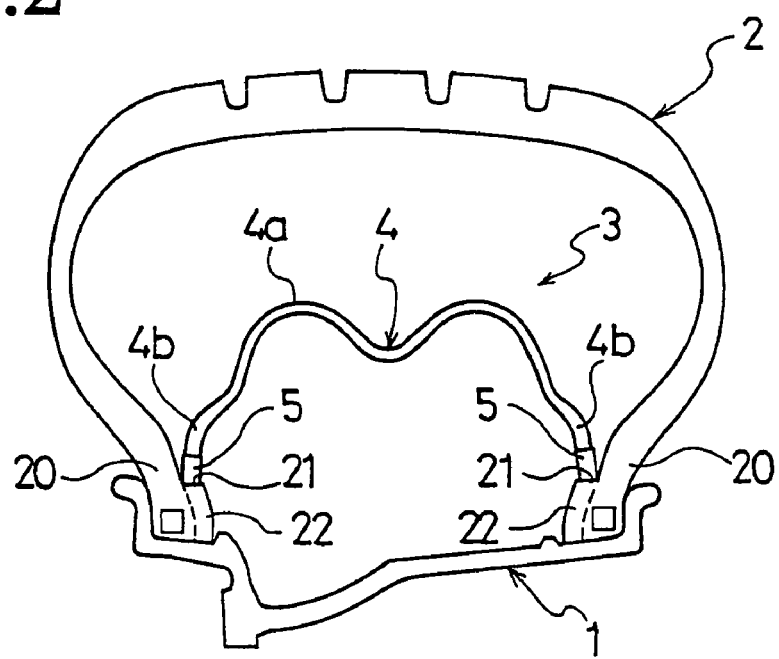
FIG. 2 is a meridian sectional view showing an essential part of a tire/wheel assembly formed in another embodiment of the present invention.

FIG. 2 is a meridian sectional view showing an essential part of a tire/wheel assembly (wheel) formed in another embodiment of the present invention. Note that the same reference numerals are used for the parts which correspond to the ones in FIG. 1, and the details thereof are omitted. In the present embodiment, a circular shell 4 and elastic rings 5 constituted a main part of a run-flat support member 3.

The elastic rings 5 are respectively attached to leg portions 4b and 4b of the circular shell 4 and locked into right and left stages 21 to support the circular shell 4. These elastic rings 5 alleviate impact and vibration of the circular shell 4 when the pneumatic tire 2 is punctured. Additionally, the elastic rings 5 as well as parts of the leg portions 4b of the circular shell 4 can be locked into the stages 21.

Rubber and resin can be used as a constituent material of the elastic rings 5, and it is more preferable to use the rubber. Examples of types of rubber are natural rubber (NR), isoprene rubber (IR), styrene-butadiene rubber (SBR), butadiene rubber (BR), hydrogenated acrylonitrile-butadiene rubber, hydrogenated styrene-butadiene rubber, ethylene propylene rubber (EPDM, EPM), butyl rubber (IIR), acrylic rubber (ACM), chloroprene rubber (CR), silicone rubber and fluoro-rubber. As a matter of course, it is possible for these types of rubber to contain an additive such as filler, vulcanizing agent, vulcanization accelerator, softener and antioxidant as appropriate. Accordingly, desired elastic modulus can be obtained based on the ratio of the rubber components.

In the tire/wheel assembly thus constituted as described above, when the pneumatic tire 2 is punctured while driving a vehicle, a support surface 4a of the circular shell 4 of the run-flat support member 3 supports the deflated pneumatic tire 2. Thus, run-flat traveling is enabled. Moreover, when fitting the pneumatic tire 2 into a wheel rim 1, the run-flat support member 3 does not freely move in the tire radial direction in a cavity of the pneumatic tire 2. Accordingly, the workability of the tire-to-rim fit is excellent. In addition, since the run-flat support member 3 is steadily coupled to the pneumatic tire 2, vehicle weight is stably sustained during run-flat traveling, and durability of the tire is improved during the run-flat traveling.

Figure 3:
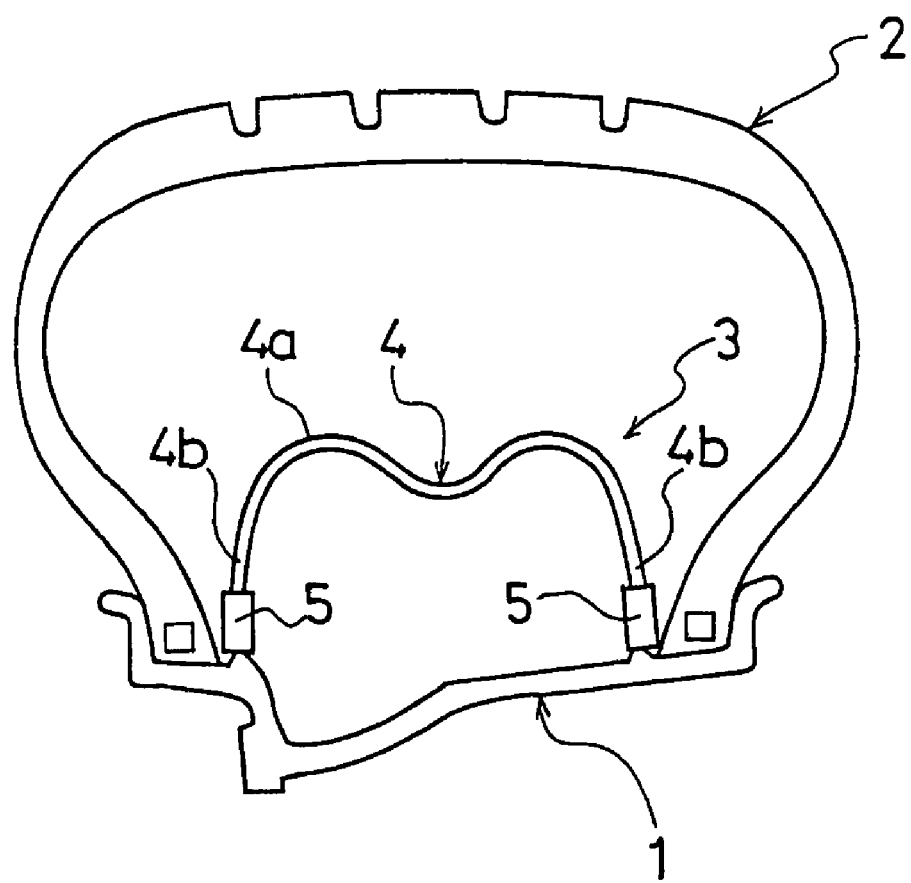
FIG. 3 is a meridian sectional view showing an essential part of a conventional tire/wheel assembly.

By contrast, as shown in FIG. 3, a conventional tire/wheel assembly with the run-flat function employs a run-flat support member 3 constituted of a circular shell 4 and elastic rings 5, in which the circular shell 4 has a support surface 4a thereof extended toward the periphery of the tire and leg portions 4b along each end of the support surface 4a, and the elastic rings 5 support the circular shell 4 on a rim 1. As a consequence, the run-flat support member 3 freely moves in a tire radial direction in a cavity of a pneumatic tire 2, and it is difficult to perform the tire-to-rim fit. In addition, it is difficult to stably attach the elastic rings 5 to rim humps.

A molding method of the aforementioned stages 21 is not particularly limited. For example, in a vulcanization process of the pneumatic tire 2, convex portions can be provided on a surface of a bladder designed for vulcanization to mold the stages 21. Alternatively, rings for molding the stages 21 can be attached to an unvulcanized tire and can be removed after vulcanization. Furthermore, the inner walls of the beads 20 can be shaved to create the stages 21 or rubber rings can be adhered to the inner walls of the beads 20 to form the stages 21 after vulcanizing a pneumatic tire without stages.

The pneumatic tire 2 is required to support the run-flat support member 3, unlike other tires. Thus, it is preferable that rubber portions 22 located farther inside than the stages 21 of the beads 20 in the tire radial direction be firmer than the adjacent rubber portions. Accordingly, weight sustaining capability of the tire is enhanced, and durability thereof is improved during run-flat traveling.

A constituent material of the rubber portions 22 located farther inside than the stages 21 of the beads 20 is not particularly limited. Nevertheless, for example, a rubber component, which is constituted by crosslinking, with organic peroxide, a composition obtained by dispersing metal salt of acrylic acid or methacrylic acid into ethylenically unsaturated nitrile-conjugated diene-based highly saturated rubber having 30% or less by weight of conjugated diene, is preferable to be used.

More specifically, a rubber composition which contains 10 to 120 weight parts of metal salt of acrylic acid or methacrylic acid and 0.3 to 10 weight parts of organic peroxide serving as crosslinking agent, for 100 weight parts of total rubber containing 40 weight parts or more of ethylenically unsaturated nitrile-conjugated diene-based highly saturated rubber having 30% or less by weight of conjugated diene, can be used. As a matter of course, it is possible to add various compounding agents, which are normally used in rubber industry, to the foregoing rubber composition.

The ethylenically unsaturated nitrile-conjugated diene-based highly saturated rubber may be a copolymer of ethylenically unsaturated nitrile such as acrylonitrile and methacrylonitrile and conjugated diene such as 1,3-butadiene, isoprene and 1,3-pentadiene. Additionally, the ethylenically unsaturated nitrile-conjugated diene-based highly saturated rubber can be a multicomponent polymer in which the foregoing two types of monomers and copolymerizable monomers such as a vinyl aromatic compound, (meth)acrylic acid, alkyl(meth)acrylate, alkoxyalkyl(meth)acrylate and cianoalkyl(meth)acrylate are compounded. To be more specific, examples of the ethylenically unsaturated nitrile-conjugated diene-based highly saturated rubber are acrylonitrile-butadiene copolymer rubber, acrylonitrile-isoprene copolymer rubber, acrylonitrile-butadiene-isoprene copolymer rubber, acrylonitrile-butadiene-acrylate copolymer rubber and acrylonitrile-butadiene-acrylate-methacrylic acid copolymer rubber. Particularly, hydrogenated NBR is more preferable to be used.

An example of metal salt of acrylic acid or methacrylic acid is zinc polymethacrylate. Examples of the organic peroxides are dicumyl peroxide, di-t-butyl peroxide, t-butyl cumyl peroxide, benzoyl peroxide, 2,5-dimethyl-2,5-di(benzoyl peroxy) hexane and 2,5-dimethyl-2,5-mono (t-butyl peroxy) hexane.

EXAMPLE

A tire/wheel assembly, in which a pneumatic tire with a tire size of 205/55R16 89V and a wheel with a rim size of 16×6½JJ are fit, was prepared. As shown in FIG. 1, stages extending in a tire circumferential direction were formed on the inner walls of a pair of right and left beads in the pneumatic tire. Meanwhile, a 1.0 mm-thick steel plate was processed to create a circular shell, and a run-flat support member was made. The run-flat support member was inserted into a cavity of the pneumatic tire to lock leg portions of the circular shell into the stages. Thus, the tire/wheel assembly (an example of an embodiment) was created.

For comparison, as shown in FIG. 3, an usual pneumatic tire having no stages on the inner walls of beads was employed, and a run-flat support member constituted of a circular shell and elastic rings was created, in which the circular shell has a support surface thereof extended toward the periphery of the tire and leg portions along each end of the support surface, and the elastic rings support the circular shell on the rim. Except for employment of the run-flat support member, the tire/wheel assembly having the same structure as the assembly in the example of the embodiment was obtained.

Durability of the two types of the tire/wheel assemblies during run-flat traveling was evaluated by the following measurement method, and the results thereof are listed in Table 1.

[Durability of the Tire During Run-Flat Traveling]

A testing tire/wheel assembly was fit in the right front wheel of a front engine/rear drive car with an engine capacity of 2.5 liter. Inner pressure of the right front tire was set to 0 kPa (200 kPa for other tires), and the car was driven in a counterclockwise direction at 90 km/h in a circular circuit. A distance for which the car was driven was measured until the car became incapable of being driven. The results of evaluation are indicated by index number, where the conventional assembly is set to 100. The larger the index number is, the better the durability during run-flat traveling was.

TABLE 1

|  | Conventional Example | Embodiment |
|---|---|---|
| Structure of Tire/Wheel Assembly | FIG. 3 | FIG. 1 |
| Durability During Run-Flat Traveling | 100 | 103 |

As shown in Table 1, the tire/wheel assembly of the example of the embodiment had better durability than that of the conventional example during run-flat traveling. The tire/wheel assembly of the example of the embodiment had sufficiently functioned as a run-flat tire. Moreover, since the pneumatic tire and the run-flat support member were integrally formed in the tire/wheel assembly of the example of the embodiment, the workability of tire-to-rim fit was better than that of the tire/wheel assembly of the conventional example.

According to the present invention, a run-flat support member constituted of a circular shell is inserted into a cavity of a pneumatic tire, in which the circular shell has a support surface thereof extended toward the periphery of the tire and leg portions along each end of the support surface. Meanwhile, stages extending in a tire circumferential direction are formed on the inner walls of a pair of right and left beads, and the leg portions of the circular shell or elastic rings attached to the leg portions are locked into the stages. As a result, it is possible to improve the workability of the tire-to-rim fit while including the core-type run-flat support member.

Hereinbefore, the preferred embodiments of the present invention have been detailed. It is to be understood that various modifications, substitutions and replacements can be made without departing from the spirit and scope of the present invention defined by the appended claims.

What is claimed is:

1. A run-flat tire, including:
    a run-flat support member constituted of a circular shell and a pair of elastic rings within a cavity of a pneumatic tire, the circular shell having a support surface extending in a tire circumferential direction and having a pair of leg portions attached to the support surface; and
    a pair of stages in the tire circumferential direction protruding from a pair of beads, an elastic ring of the pair of elastic rings having a first face in contact with a leg portion of the pair of leg portions and having a second face opposite the first face in contact with a stage of the pair of stages,
    wherein the stage contacts a bead of the pair of beads to form a corner, the corner receiving the elastic ring.

2. The run-flat tire according to claim 1, wherein the support surface has at least one convexly curved portion aligned in a tire axial direction.

3. The run-flat tire according to claim 1, wherein the support member is separated from a tread of the pneumatic tire under normal driving conditions.

4. The mn-flat tire according to claim 1, wherein the support surface is structurally adapted to support the pneumatic tire when the pneumatic tire is deflated.

5. The run-flat tire according to claim 1, wherein a rubber portion protrudes from the bead in a tire axial direction, a surface of the rubber portion being the stage.

6. The run-flat tire according claim 5, wherein the rubber portion is harder than the bead.

7. A tire/wheel assembly, in which a pneumatic tire is fit onto a wheel rim, including:
   a run-flat support member constituted of a circular shell and a pair of elastic rings within a cavity of a pneumatic tire, the circular shell having a support surface extending in a tire circumferential direction and having a pair of leg portions attached to the support surface; and
   a pair of stages in the tire circumferential direction protruding from a pair of beads, an elastic ring of the pair of elastic rings having a first face in contact with a leg portion of the pair of leg portions and having a second face opposite the first face in contact with a stage of the pair of stages,
   wherein the stage contacts a bead of the pair of beads to form a corner, the corner receiving the elastic ring.

8. The tire/wheel assembly according to claim 7, wherein the support surface has at least one convexly curved portion aligned in a tire axial direction.

9. The tire/wheel assembly according to claim 7, wherein the support member is separated from a tread of the pneumatic tire under normal driving conditions.

10. The tire/wheel assembly according to claim 7, wherein the support surface is structurally adapted to support the pneumatic tire when the pneumatic tire is deflated.

11. The tire/wheel assembly according to claim 7, wherein a rubber portion protrudes from the bead in a tire axial direction, a surface of the rubber portion being the stage.

12. The tire/wheel assembly according claim 11, wherein the rubber portion is harder than the bead.

* * * * *